Jan. 8, 1952   W. J. DUESLER   2,581,946
INSIDE AND OUTSIDE CALIPERS, HEIGHT AND
DEPTH GAUGE, WITH DIAL INDICATOR
Filed Jan. 25, 1949   5 Sheets-Sheet 1
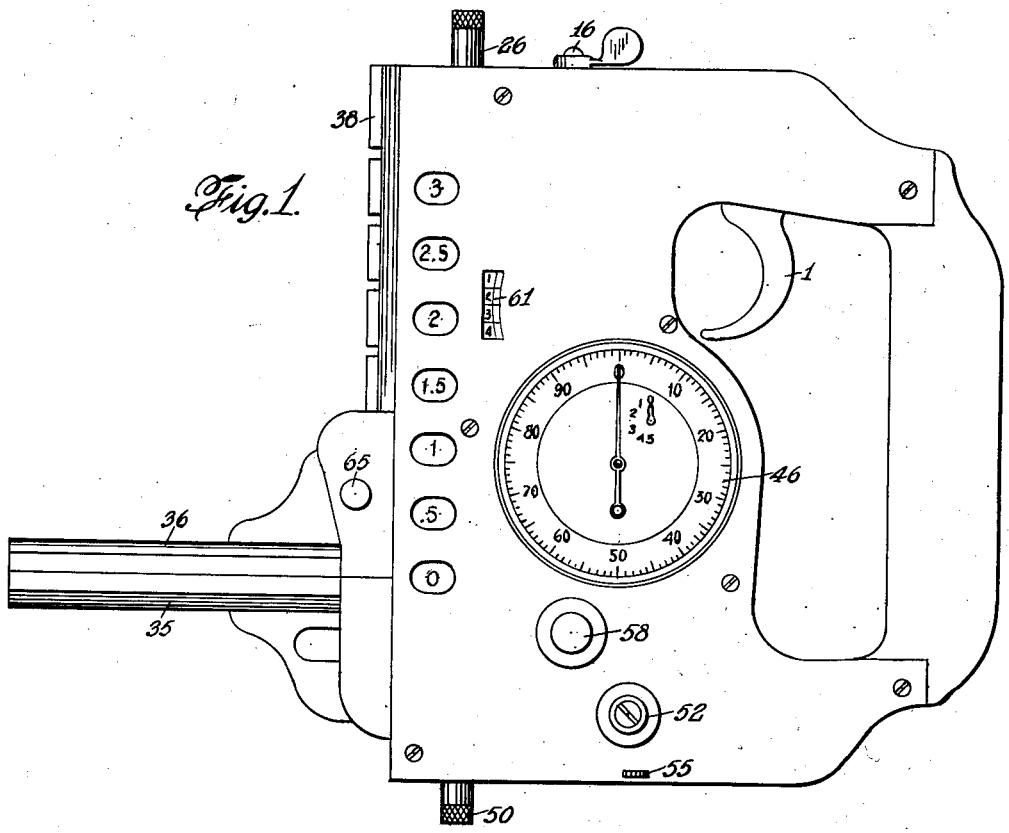
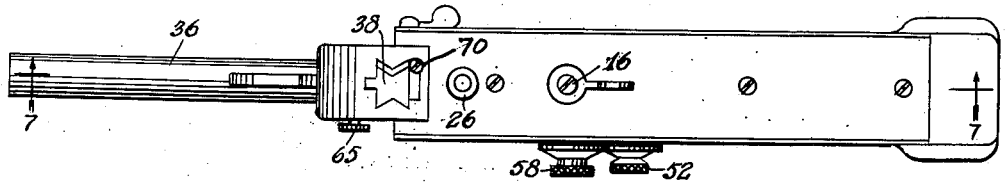
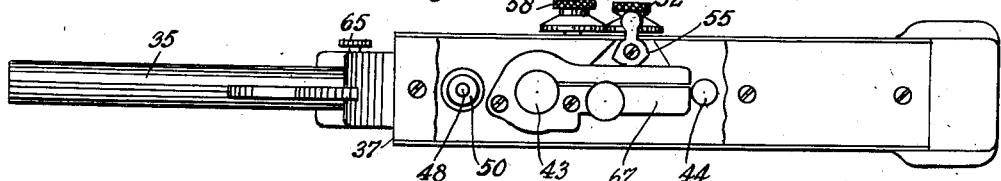
INVENTOR.
WALTER J. DUESLER
BY
ATTORNEY.

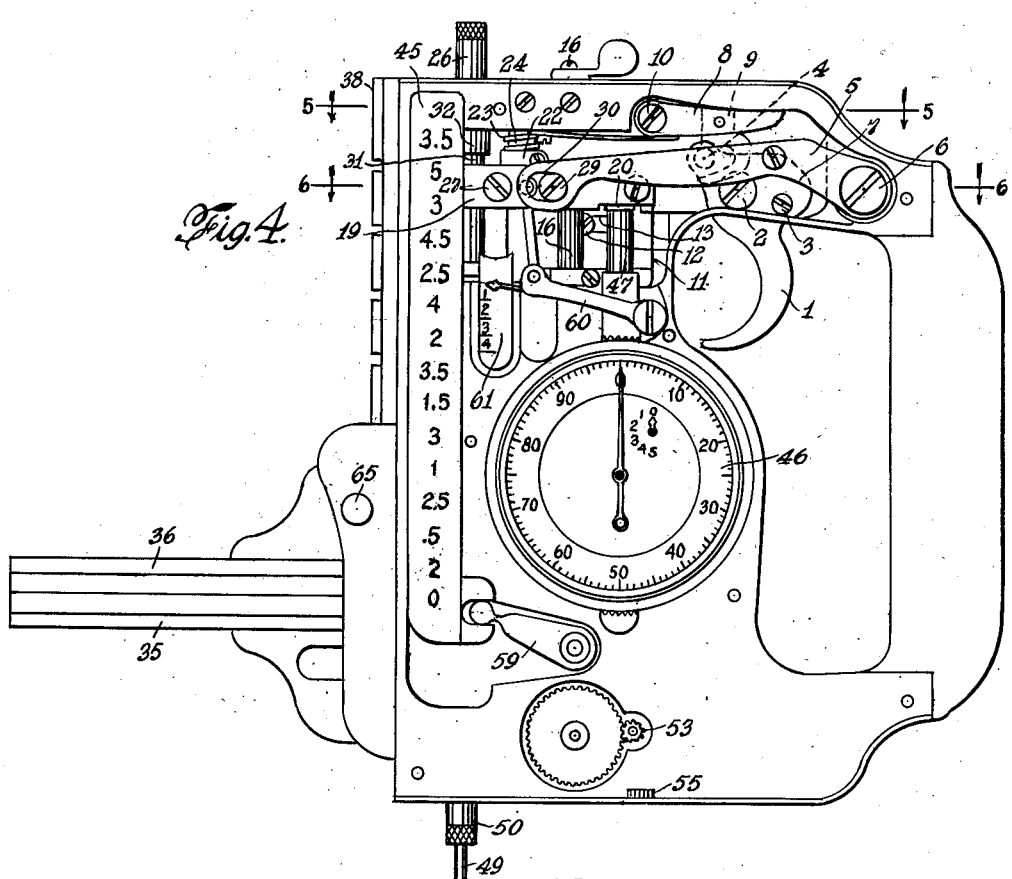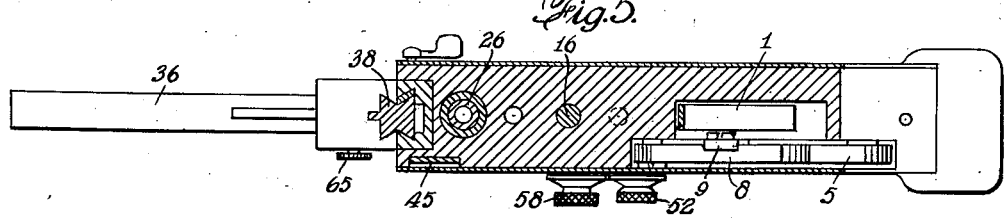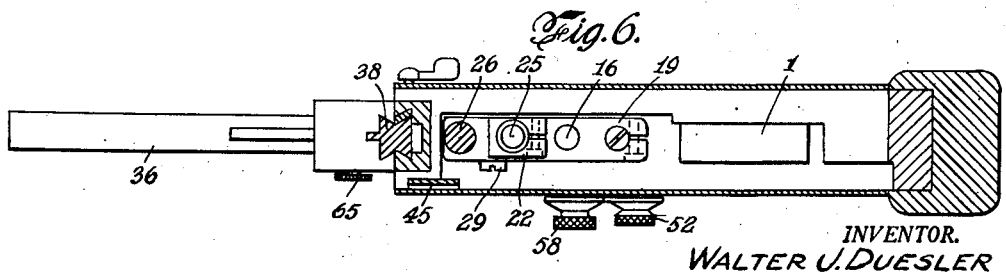

Jan. 8, 1952   W. J. DUESLER   2,581,946
INSIDE AND OUTSIDE CALIPERS, HEIGHT AND
DEPTH GAUGE, WITH DIAL INDICATOR
Filed Jan. 25, 1949   5 Sheets-Sheet 3
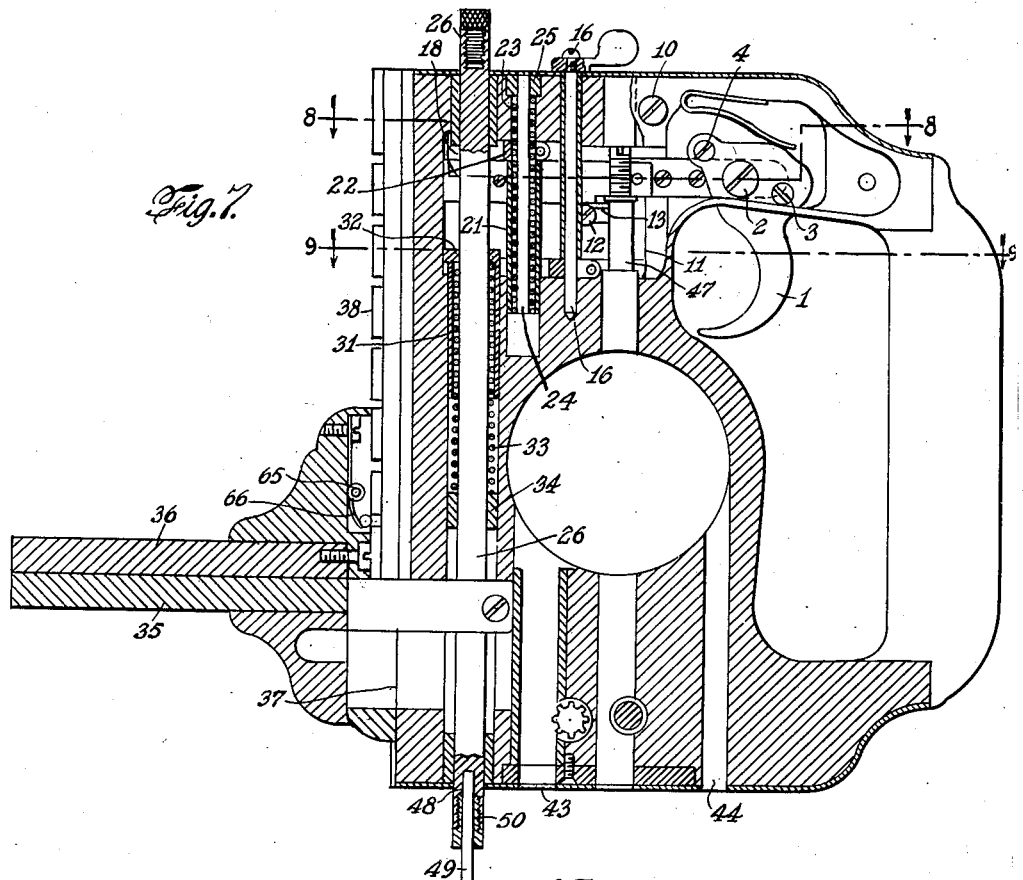
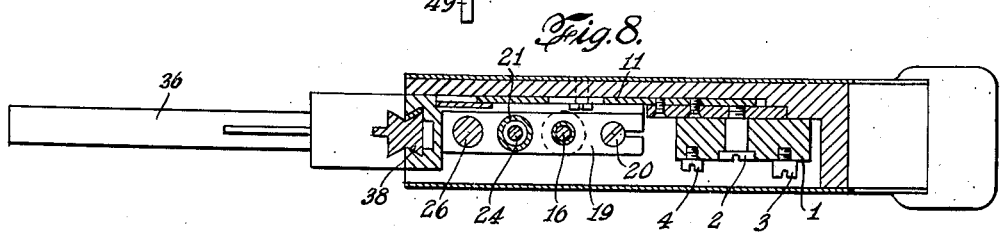
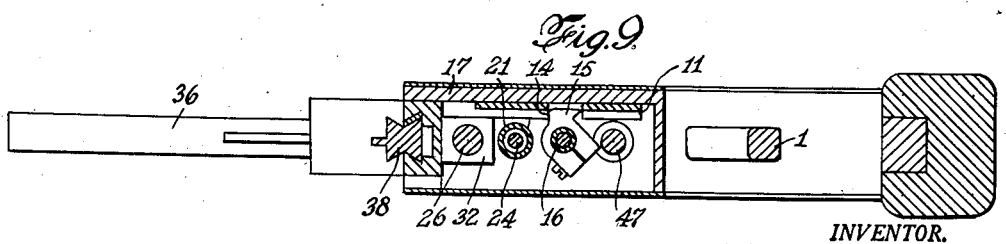
INVENTOR.
WALTER J. DUESLER
BY
ATTORNEY.

Jan. 8, 1952 W. J. DUESLER 2,581,946
INSIDE AND OUTSIDE CALIPERS, HEIGHT AND
DEPTH GAUGE, WITH DIAL INDICATOR
Filed Jan. 25, 1949 5 Sheets-Sheet 4

INVENTOR.
WALTER J. DUESLER
BY
*Robert E. Burns*
ATTORNEY.

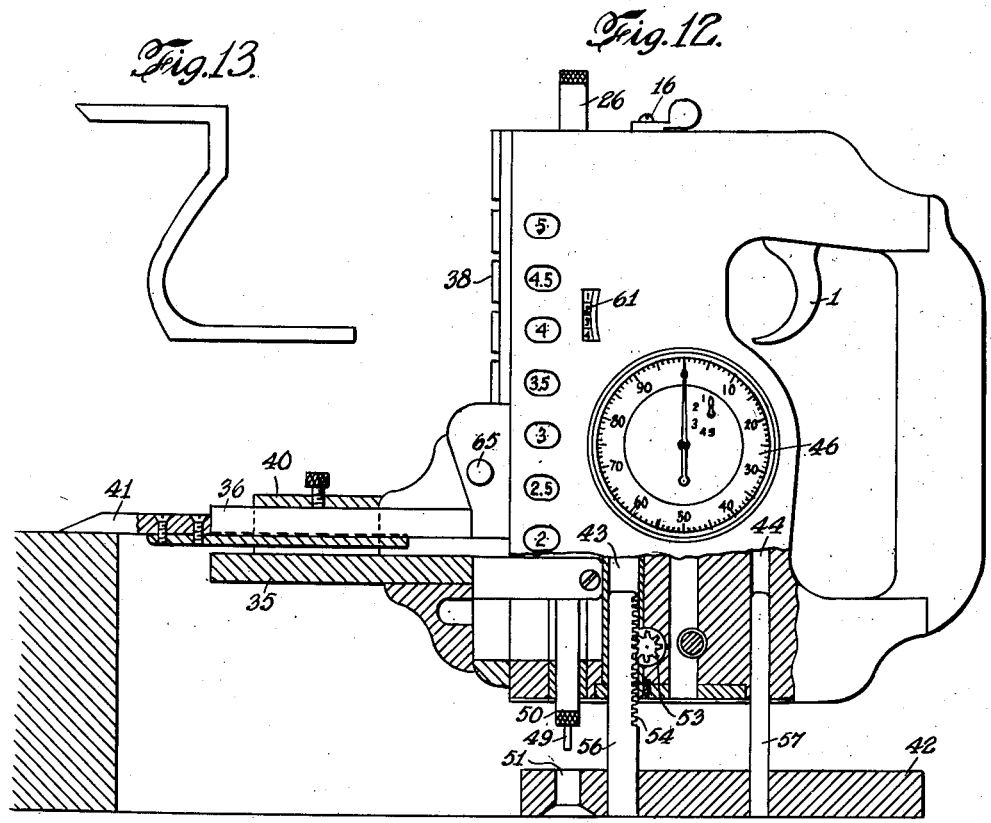

Patented Jan. 8, 1952

2,581,946

UNITED STATES PATENT OFFICE 2,581,946

INSIDE AND OUTSIDE CALIPERS, HEIGHT
AND DEPTH GAUGE, WITH DIAL INDICATOR

Walter J. Duesler, Gloversville, N. Y.

Application January 25, 1949, Serial No. 72,681

4 Claims. (Cl. 33—147)

This invention relates to measuring instruments, in particular to instruments capable of making a variety of measurements such as outside and inside diameters, thickness, heights and depths.

It is an object of my invention to provide an instrument with which measurements, such as the foregoing, may be made quickly and accurately. A further object is to provide an instrument making measurements of all the above types on a single gauge. Other objects and advantages of my invention will appear hereinafter.

Objects of my invention are accomplished by providing an instrument in which a movable jaw is impelled by springs, either toward or away from a base of reference, depending on the measurement to be made. The base of reference may be another jaw, may be a base plate, or may be some other base having fixed positions. Further objects of my invention are accomplished by the construction and operation of the jaws of my measuring instrument allowing readily fixing attachments thereto, and allowing employment of the same jaws for various types of measurements. The invention will be explained more fully in connection with the accompanying drawings.

In said drawings,

Fig. 1 is a front view of one form of my measuring instrument ready for use to measure outside diameters.

Fig. 2 is a top view of the instrument shown in Fig. 1.

Fig. 3 is a bottom view of the same instrument.

Fig. 4 is a front view with front cover removed.

Fig. 5 is a section along the line 5—5 of Fig. 4.

Fig. 6 is a section along the line 6—6 of Fig. 4.

Fig. 7 is a front view along the line 7—7 (approximately mid-section) of Fig. 2.

Fig. 8 is a section along the line 8—8 of Fig. 7.

Fig. 9 is a section along the line 9—9 of Fig. 7.

Fig. 12 is a front view, with the lower part of cover cut away, showing the instrument ready for use in measuring the height of an object.

Fig. 13 shows a form of finger attachment for height measurements.

Fig. 14 is a detail showing attachment of a depth measuring auxiliary to the movable jaw of the measuring instrument illustrated in Fig. 1.

Figure 10:
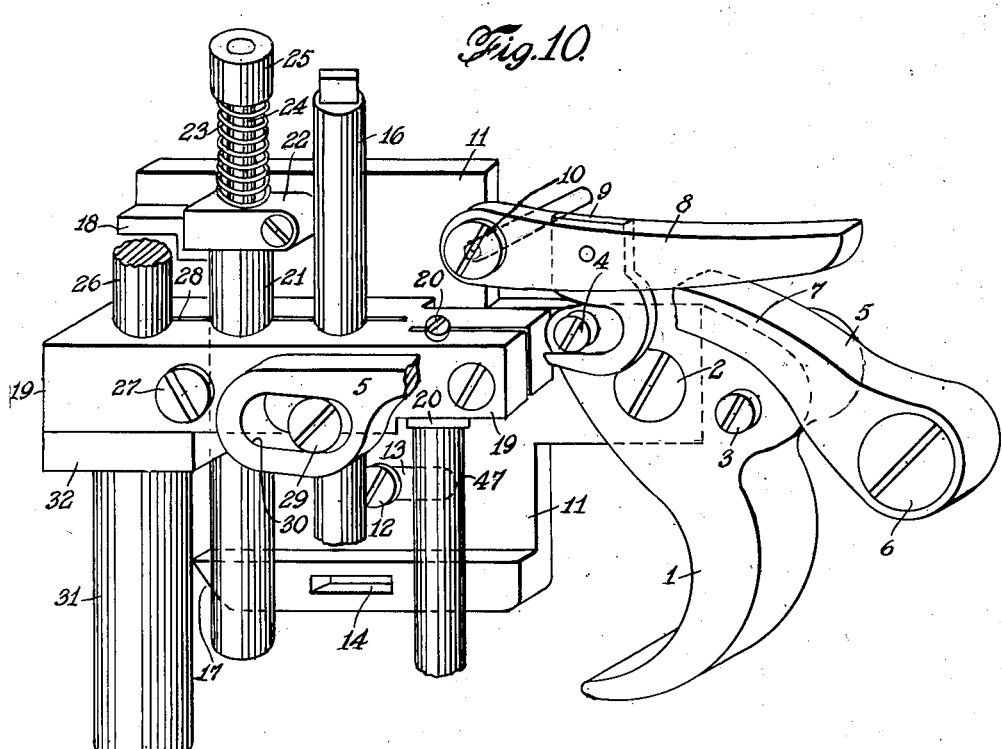
Fig. 10 is a perspective front view of principal working parts, some being cut away to show parts to rear.

In the drawings a given numeral designates a given part throughout. Referring in particular to Fig. 10, 1 is a trigger pivoted on the pivot 2 mounted on plate 11 and carrying cams 3 and 4. 5 is a lever arm (shown with the mid-portion broken away), pivoted at 6 and having an upwardly curved portion 7. 8 is a lever arm carrying a hook piece 9 and pivoted at a pivot 10 mounted on the frame of the instrument.

Figure 11:
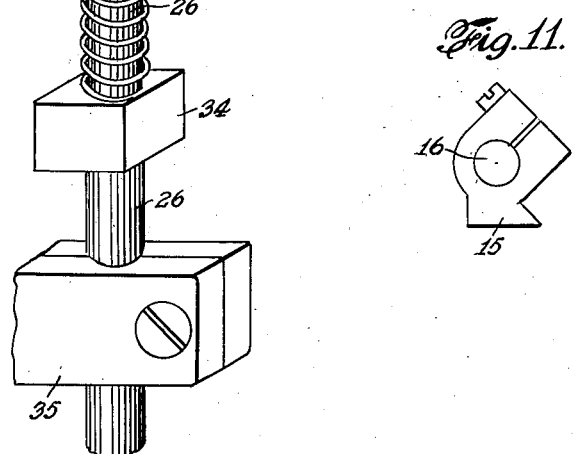
Fig. 11 is a bottom view of the rod 16 of Fig. 10.

11 is a plate or catch which slides along a support in the form of a screw 12 by means of slot 13. In the lower edge of plate 11 is an opening 14 which engages latch 15, attached to rod 16, (shown in bottom view, Fig. 11). The lower edge of plate 11 has an upward bevel at the left, as shown at 17. At its upper left-hand corner, plate 11 carries a bar 18, the upper right corner of which is beveled downwardly to engage the underside of bearing 22, described below, when catch 11 is in its rightward position.

19 is a horizontal bar through which pass (proceeding from right to left) a rod 20, the rod 16 previously referred to, sleeve 21 carrying bearing 22 affixed thereto, and in which are spring 23 and guide 24 with head 25 fixed in the frame (see Fig. 7) against which spring 23 rests, and rod 26. The bar 19 grips the rod 26 when screw 27 in the bar is tightened to close the slot 28. Bar 19 slides over sleeve 21 and over rod 16 and grips rod 20. A projection 29 on the front of bar 19 fits into slot 30 in the lever arm 5.

Rod 26 is encircled by sleeve 31, which carries bearing 32 affixed thereto, and encloses spring 33, which at its lower end bears against a fixed bushing 34, which is pressed into the frame, as may be seen in Fig. 7. Rod 26 slides in the bushing 34. To the lower end of rod 26 is affixed the movable jaw 35 (shown broken away). Bearing 32 and sleeve 31 are preferably machined from one piece of metal and are free to slide independently of rod 26, as for example, when pushed downwardly with the finger when desired to reverse the direction of spring action, and also when spring 23 is in use and spring 33 is restrained. Then any movement of the bar 26 causes this bar to slide through the small hole in the otherwise closed end of sleeve 31. When the spring 33 is free to move the rod 26, sleeve 31, bar 19 and jaw 35 all move as a unit under pressure of the spring 33. The bearing 32 and rod 26 are in no way connected.

The construction of movable jaw 35 and fixed jaw 36 as thin parallel jaws with flat inner surfaces on which attachments fit, is illustrated in Figs. 7 and 8 which show also the mode of attachment of these jaws to the instrument whereby they are held to tracks 37 and 38 on which they slide with no up and down rocking play.

In Fig. 12 fixed jaw 36 is shown with finger attachment 40 and finger 41 for measuring heights. The vertical rods 56 and 57 of base plate 42 fit into openings 43 and 44 when the instrument is used for measuring heights.

The scale 45, shown in Fig. 4, is marked to correspond to the various alternative positions of the fixed jaw 36. The scale has three positions and three sets of markings, only one set of which is exposed at a time through the cover of the instrument. One set (0 to 3 inches) applies when the instrument is adjusted to measure outside diameter (Fig. 1), another for measuring inside diameters (.5 to 3.5 inches) and the third for measuring heights (2 to 5 inches). The knob 58 and arm 59 serve to shift scale 45 to its various positions.

Reference is made to Fig. 4 for a showing of the dial gauge 46 on which the final fractions of an inch less than a half inch are recorded in thousandths of an inch. Plunger 47 actuates the gauge. The pointer 60, pivotally attached to bar 19, indicates on scale 61 the number of revolutions of the pointer of gauge 46.

Details of the sliding rod 26 are shown in Fig. 7. In particular, the opening 48 at the lower end of rod 26, rod or jaw 49 fitting into said opening, and expansion screw 50 holding rod 49, are illustrated.

Finger attachments used in making height measurements are shown in Figs. 12 and 13. The attachment shown in Fig. 13 may be used to accommodate heights greater than can be measured with the form of finger shown in Fig. 12. Fig. 14 shows details of an attachment for measuring depths, wherein the clamp 39 is held tight by the nut 62. A rod 63 of known length below base plate 42 is held in position by expansion screw 64.

When my instrument is used to measure outside diameters or thickness of plate, etc., the operation is as follows:

The trigger 1 is squeezed, causing the cam 4 to bear down on the hook 9, thus bringing lever 8 to bear on lever 5. Lever 5 being connected to bar 19 through the projection 29 carries bar 19 downward. Bar 19 in turn carries vertical rod 26 downward against the pressure of spring 33, pushing up from fixed bushing 34 against bearing 32.

The downward motion of bar 26 carries movable jaw 35 down until the jaws will fit around the object being measured. The action of spring 33 forcing the jaws toward each other assures a quick and accurate measurement.

The fixed jaw 36 can be released by pushing button 65 thus forcing spring 66 away from track 38 (Fig. 7) and can be placed as required in any of the fixed positions at accurate half-inch intervals along track 38. Scale 45 is graduated from 0 to 3 inches to correspond to these positions. By loosening a screw 70 (Fig. 2) the double dovetailed track 38 can be pulled out to form an extension increasing the capacity of the instrument by three inches.

To use my instrument for measuring inside diameters, movable jaw 35 is first fully depressed. In this position bearing 32 will be opposite to and below the beveled edge 17 of plate 11. The rod 16 is now rotated so that catch 15 (Fig. 11) engaging with opening 14 in plate 11 slides the plate to the left.

The bevel 17 is thus slid over the back edge of bearing 32 thus holding the bearing down and restraining spring 33 from acting on the horizontal bar 19 to force upward rod 26 carrying jaw 35. At the same time, the leftward movement of plate 11 releases bearing 22 by shifting bar 18 to the left. Spring 23 now acts downwardly on the end of sleeve 21 to push bearing 22 down against bar 19, and thus maintain the movable jaw 35 in said depressed position away from the fixed jaw 36.

Moreover the leftward movement of plate 11 carries with it trigger 1, to the left, clear of hook 9. In this position of the trigger (and with lever arm 5 in a down position corresponding to the down position of bar 19) the cam 3 on trigger 1 engages with the curvature 7 in lever arm 5. Putting rightward pressure on the finger piece of the trigger lifts cam 3 against arm 5, thus raising bar 19 and bringing jaw 35 toward jaw 36. The jaws may accordingly be fitted inside an opening and may be quickly and accurately adjusted to position giving the inside measurement.

Again, the upper fixed jaw may be placed accurately at any of the positions at half-inch intervals along its track. When inside diameters are being measured, the scale 45 is placed to bring the calibrations .5 to 3 inches into register with the fixed positions of jaws 36.

Whether inside or outside measurements are being made, the final fractions of an inch less than half inch are recorded (in thousandths of an inch) on the gauge 46 (Fig. 4). The needle of the gauge is actuated by rod 26 on bar 19, which bears against the plunger 47 of the gauge. This gauge may take any of a number of forms. For example, it may be the gauge described in United States Patent No. 2,117,268 of May 17, 1938, to Ames.

Fig. 12 shows my measuring instrument in use for measuring the height of an object which is between 2 inches and 2.5 inches high. For this purpose extension finger 41 is attached to the upper jaw. The lower jaw 35 is in upward position as for measuring outside diameters.

Rod 49 is then fitted into the hollow opening 48 at the lower end of sliding rod 26 as shown in Fig. 7, and is held in place by the friction of expansion screw 50 (Fig. 7). The base plate 42 is put in place so that the instrument rests on the base plate while the rod 49 passes through opening 51 in the base plate, and just touches the surface on which the base plate is resting.

Fixed jaw 36 is now brought to the position on track 38 which is within half an inch of the top of the object being measured. Calibrations of scale 45 (Fig. 4) indicate the height of the fixed positions for jaw 36 above the surface on which base plate 42 is resting. In the instrument shown in the figures, these heights vary in half inch intervals from 2 to 5 inches.

Now knob 52 (Fig. 5) is rotated to raise the instrument above the base plate by the meshing of the teeth of pinion 53, with the teeth of rack 54 (Fig. 12). When finger 41 just fits over the object to be measured the instrument is locked in position with the lock 55 (Fig. 3) which compresses the split ring 67 around rod 56 on base plate 42. The final fractions of an inch, less than half an inch, by which it was necessary to raise the instrument to make this final adjustment are readily found by depressing movable jaw 35 until rod 49 again just touches the surface on which the base plate rests. The distance through which jaw 35 was moved downwardly, as read on gauge 46, is exactly equal to the height by which the instrument was raised to make the final adjustment, and is therefore added to the approximate height read from scale 45 to give the exact height measured.

My instrument may also be used for noting small differences in heights. For this purpose finger 41 is attached to movable jaw 35, the springs are adjusted to actuate this jaw downwardly, and the instrument is locked to the base plate at slightly below the right height for finger 41 to clear the object being measured. The finger then is pushed on its bevel over the object and the dial reading on the gauge noted. Differences due to low or high spots at other points of the object or objects being measured are recorded directly as differences in the dial readings.

The heights of undercut surfaces can be measured or compared with finger 41 attached to jaw 35 in a similar manner to the foregoing except that the action of the springs will be reversed from the preceding, so that the spring forcing jaw 35 upwardly will be in action and the spring forcing the jaw downwardly will be restrained.

For measuring heights or comparing heights greater or lesser than finger 41 will accommodate, a modified finger of known height may, of course, be used. For example, an offset finger such as shown in Fig. 13 may be used to compare heights greater or lesser than the range which finger 41 can reach.

My instrument can readily be used, with the aid of a suitable attachment on the movable jaw, to measure depths. Such an attachment is, for example, a steel rod held as shown in Fig. 14. The base plate is put on and the springs are adjusted to force jaw 35 down. A rod of known length within half an inch of that required is attached to jaw 35. The final fractions of an inch of depth less than half an inch are read from the gauge when the rod rests on the bottom of the concavity or hole being measured, and are added to the known length of the rod below the base plate when jaw 35 is fully raised. Rods of known length below base plate 42 held in opening 48 of rod 26 may likewise be used for depth measurements.

Depths of surfaces which are concave upward, or of holes opening downward, can be measured by putting the rod attachment on the fixed jaw of the instrument, and then proceeding in an analogous manner to that described above for measurement of heights of objects.

Other attachments for other measurements which can be registered as upward or downward movements will suggest themselves to those skilled in the art.

What I claim and desire to secure by Letters Patent is:

1. In a measuring instrument, the combination of a movable jaw, a gauge connected to said jaw, which gauge responds to the motion of said jaw, at least one base of reference having fixed positions, a sliding rod on which said movable jaw is mounted, which rod carries said movable jaw away from and toward the base of reference, a pair of springs each acting parallel to the sliding rod but in opposite directions, a bar perpendicular to said sliding rod and attached thereto, two bearings each actuated by one of said springs, and each of which bears against the aforesaid bar under the action of the spring corresponding to the bearing, a catch having two positions in each of which the catch holds one of the aforesaid bearings so that the corresponding spring is restrained from acting while the other spring is free to act through its bearing on the bar and thus on the sliding rod and movable jaw, whereby the movable jaw is impelled in a desired sense with respect to the base of reference.

2. A measuring instrument, as defined in claim 1, which includes a trigger, two sets of levers each having two positions with reference to said trigger, in one of which positions one set of levers engages with the trigger and said bar, said one set of levers acting on said movable jaw, in response to pressure on the trigger, in opposition to one of said springs acting on said jaw, and in the other of which positions said one set of levers is disengaged and the other set is engaged, acting on the movable jaw in response to pressure on the trigger in the opposite direction from said one set, and a two-position latch which operates the catch for the springs and shifts the aforesaid levers and trigger into that relative position in which the trigger acts, through the levers, counter to whichever spring is in action.

3. A measuring instrument as defined in claim 1 wherein said movable jaw is of elongated form with one flat surface and said base of reference is in the form of an elongated jaw parallel to the movable jaw and has a flat surface facing the flat surface of the movable jaw, to which jaws attachments may be fitted.

4. A measuring instrument as defined in claim 1, having fittings for a base plate, which base plate engages with said instrument through gears allowing the instrument to be raised and lowered above the base plate, a lock whereby said instrument is locked in a raised position above the base plate, said instrument having a measuring jaw with fixed positions and a movable jaw mounted on said sliding rod, said jaw comprising an adjustable extension which can be brought by motion of the sliding rod to the same definite position with reference to the base plate for various heights of the instrument above the base plate.

WALTER J. DUESLER.

REFERENCES CITED

The following references are of record in the file of this patent:

UNITED STATES PATENTS

| Number | Name | Date |
|---|---|---|
| 1,259,196 | Ames | Mar. 12, 1918 |
| 2,324,998 | Dague | July 20, 1943 |
| 2,331,779 | Hjarpe et al. | Oct. 12, 1943 |
| 2,358,264 | Taylor | Sept. 12, 1944 |
| 2,429,923 | Cavicchi | Oct. 28, 1947 |

FOREIGN PATENTS

| Number | Country | Date |
|---|---|---|
| 24,661 | Great Britain | Nov. 13, 1903 |
| 376,892 | Germany | June 7, 1923 |